March 25, 1924.
O. R. PFAU
1,487,756
PNEUMATIC PUMP AND MEASURING APPARATUS
Original Filed March 15, 1920
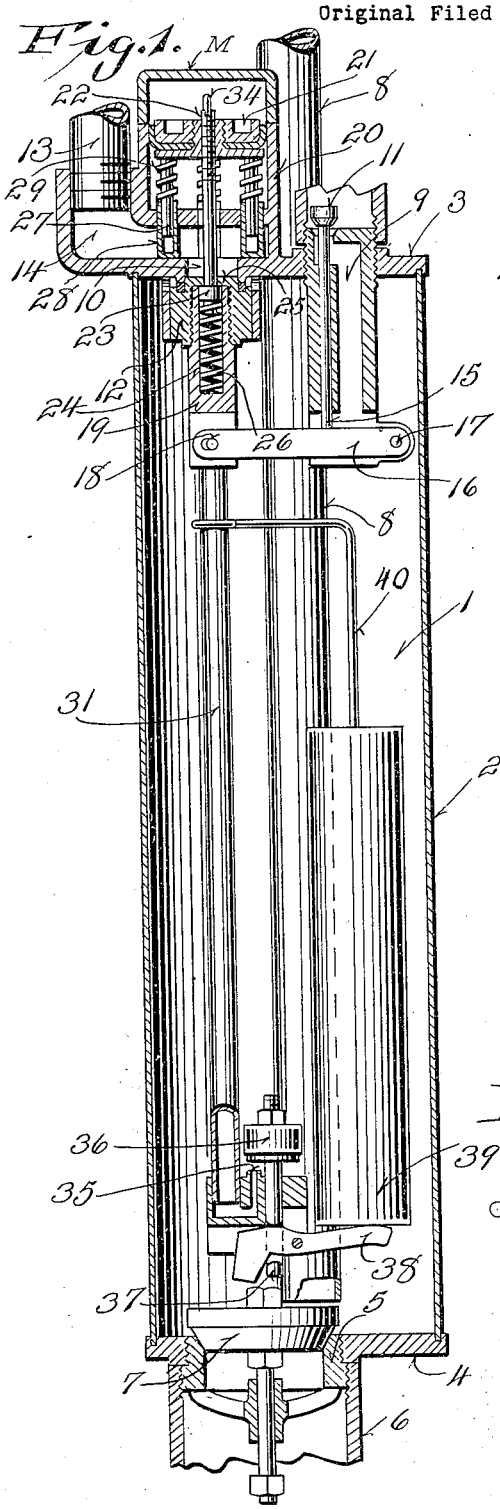
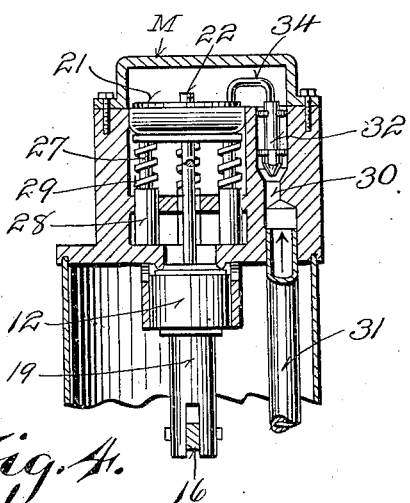
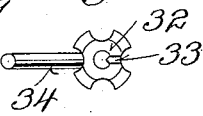
Inventor:
O. R. Pfau
By Young & Young Patented Mar. 25, 1924.

1,487,756

UNITED STATES PATENT OFFICE.

OTTO R. PFAU, OF MILWAUKEE, WISCONSIN, ASSIGNOR, BY MESNE ASSIGNMENTS, TO MARVEL FRESH WATER SYSTEM CORPORATION, A CORPORATION OF WISCONSIN.

PNEUMATIC PUMP AND MEASURING APPARATUS.

Application filed March 15, 1920, Serial No. 365,828. Renewed August 3, 1923.

*To all whom it may concern:*

Be it known that I, OTTO R. PFAU, a citizen of the United States, and resident of Milwaukee, in the county of Milwaukee and State of Wisconsin, have invented certain new and useful Improvements in Pneumatic Pumps and Measuring Apparatus; and I do hereby declare that the following is a full, clear, and exact description thereof.

My invention relates to new and useful improvements in measuring apparatus for liquids in combination with means for conveying the measured liquid.

The principal object of my invention is to provide a pneumatically controlled pump adapted to relay liquid from one receptacle to another together with means for measuring the liquid.

Another object is to provide a combined pump and meter of this character with means whereby the escape of air by leakage is prevented through the medium of a liquid seal.

Another object is to provide a combined pneumatic pump and meter with quick opening and closing air inlet and exhaust valves. A still further object is to provide a combined pneumatic pump and meter with a fluid actuated motor for controlling the air valves. The connection between the motor and the measuring or pump chamber is controlled by a quick opening and closing valve, the actuating means therefor being a weight formed of some buoyant material.

With the foregoing and still further objects in view, which objects will become apparent as the description proceeds, the invention resides in the novel features of construction, combination and arrangement of parts which will be hereinafter more particularly described and claimed.

In the accompanying drawings:

Figure 1 is a diametrical sectional view on the plane of the line 1—1 of Figure 2.

Fig. 2 is a plan view of the invention.

Fig. 3 is a partial section view, taken on line 3—3 of Figure 2.

Figure 4 is a plan view of the motor valve and its actuating means.

Referring more particularly to the drawing, it will be seen that the reference numeral 1 designates a measuring chamber preferably consisting of a cylindrical wall 2 of glass or other transparent material having an upper head 3 and a lower head 4; the latter part is provided with a valve seated inlet opening 5 with which a water supply pipe 6 connects. An ordinary one-way circular valve 7 controls the opening 5 and permits liquid to enter the chamber 1, but prevents the return thereof.

The upper head 3 has a liquid outlet pipe 8 extending therethrough, the inner end of this pipe being terminated adjacent the lower head 4, while the other end extends to a suitable point where it is desired to discharge the liquid contents of the chamber. Also the head 3 is provided with an air inlet 9 and an air exhaust port 10. These air passageways are controlled by a compound valve structure including an inlet valve 11 and exhaust valve 12, the same being constructed to seat in opposite directions, that is to say the inlet valve 11 closes inwardly and the exhaust valve closes outwardly, inasmuch as it is located within the chamber 1. An air exhaust pipe 13 communicates with the port 10 through a passageway 14 formed in the head 3.

The air inlet valve 11 is provided with a relatively long stem 15 which slides vertically in a guide carried by the air inlet 9, which projects into the chamber 1 as shown in Figure 1. The lower or inner end of the stem 15 rests upon the intermediate portion of a lever 16 pivoted as at 17 to said air inlet 9, and the opposite end of this lever 16 is loosely pivoted as at 18 to the stem 19 of the valve 12.

The opening and closing of these valves 11 and 12 is automatically and positively controlled by a motor M, the same including a motor cylinder 20 and a motor piston 21. From Figures 1 and 3 it will be seen that the piston rod 22 extends longitudinally of the chamber 1 and enters the upper end of the same through the exhaust port 10, this end of the piston rod having a head 23 slidably disposed in a bore 24 formed in the stem 19 of the valve 12. Movement of the head 23 outwardly of the bore 24 is limited by a portion 25 of the valve 12, and inward movement is opposed by an expansile spring 26. By this arrangement it will be seen that the piston 21 is yieldably connected with the exhaust valve 12.

The piston 21 reciprocates longitudinally and is guided in its movement by a plurality of guide pins 27 slidable in guide sockets 28. Surrounding each of these guide pins 27 is an expansile coil spring 29, one end of which bears against one side of the piston 21, the other end against the end of the adjacent socket 28. These springs being of the expansile type, the piston 21 will be continuously urged outwardly of the cylinder 20 or in a direction to move the exhaust 12 into closed position. Movement of the motor piston in the opposite direction, or in a direction to open the exhaust valve 12 is controlled by liquid pressure, liquid being permitted to enter the cylinder 20 through a liquid passageway 30 which communicates with a liquid pressure tube 31; this tube extends longitudinally of the chamber 1 and terminates adjacent the head 4. A valve 32 is disposed in the passageway 30, this valve being constructed to open when liquid is forced up the tube 31 in the direction of the arrow in Figure 3. A groove 33 is cut in the valve 32 to form a bleed whereby liquid may leak from the cylinder 20 back into the tube 31 when pressure thereon is released. In addition to being actuated by liquid pressure, this valve 32 is also mechanically opened by the engagement of the piston 21 with an arm 34 carried by the stem of said valve.

The terminating end of the tube 31 has a valve seat 35 against which a valve 36 is adapted to rest under certain conditions. A relatively long stem 37 extends from the valve 36 and is connected with an intermediately pivoted valve actuating lever 38, said stem being engaged with one end of said lever. The opposite end of the lever is designed to be engaged with a weight consisting of a buoyant body 39, the same being slidable longitudinally of the chamber 1 on a guide rod 40.

In the use of this apparatus, the chamber 1 is so located with respect to the source of liquid supply that it will be readily filled by the flow of liquid through the inlet 5. For instance if the invention is to be used for pumping water from a well, then chamber 1 can be submerged in the water: on the other hand if the apparatus is to be operated to relay a quantity of liquid from one receptacle to another, pressure may be supplied to the liquid in the first receptacle, thereby forcing the same into the chamber when the pressure therein is less than the pressure in the first receptacle.

In Figure 1 the parts of the apparatus are arranged in the position which they will occupy at the moment when the major portion of the supply of liquid in the chamber 1 has been expelled and a new supply is about to enter. However, assuming that the chamber 1 has received its full supply and the same is ready to be expelled through the pipe 8, the valve 11 will be opened and the valve 12 closed as shown thus permitting compressed air or the like to enter the inlet 9 and the upper portion of the chamber 1. Thus as a continued supply of compressed air enters the chamber the liquid level will be lowered because said liquid is being forced up the pipe 8, the liquid level thus falling until a point spaced slightly above the valve seat 35 is reached. As the liquid level falls the weight 39 will descend and eventually engage the lever 38 and will rest thereon until the liquid recedes to such an extent that the weight of the float 39 will rock the lever 38 and pop open the valve 36. The desired quick opening of the inlet to the tube 31 is thus procured.

With this valve 36 open the air pressure in the chamber 1 will not only be exerted to force the liquid up the pipe 8, but it will also be used to force the liquid in the same direction in the tube 31 and thence past the valve 32 into the motor cylinder 20. The piston 21 of the motor being in the position shown in Figures 1 and 3, the exhaust valve 12 is, of course, closed. The pressure of the liquid being forced by the air into the cylinder 20 will act upon the piston 21 to force the same inwardly or toward the chamber 1 against the tension of the springs 29, and as this piston 21 first begins to move in this direction the spring 26 will likewise be compressed. When the compression of this last mentioned spring reaches a predetermined degree, the force of the moving piston will be exerted to open the exhaust valve 12, which opening will be quite rapid rather than progressive in view of this construction.

The exhaust valve 12 being opened by the motor M, the inlet valve 11 will be simultaneously closed to cut off the supply of compressed air. The air which has been permitted to enter the chamber 1 to force the liquid therefrom may now exhaust through the port 10, and as this exhaustion takes place a new supply of liquid enters the chamber 1 through the inlet 5.

Upon the raising of the liquid level in chamber 1 as a result of this new supply, the float 39 will be elevated from the lever 38 and the valve 36 permitted to close. During this time, or as soon as the valve 11 is closed, the tension of springs 26 and 29 is being exerted to return the piston 21 to its initial position as indicated in the drawing, and the liquid on one side of said piston is being forced out of the motor cylinder 20 and back into the tube 31 through the bleed 33 in the valve 32. When practically all of the air has been expelled from the chamber 1, or in other words when the same is nearly filled with a new supply of liquid, the piston 21 will engage the arm 34 and open the valve 32, thus allowing the liquid in the motor cylinder to be very rapidly forced therefrom with the consequent quick closing of the exhaust valve 12 and a quick opening of the inlet valve 11. The valve 36, of course remains open a sufficient length of time to permit the necessary amount of liquid to be forced from the motor cylinder 20.

Since these motions of the several parts of the invention are consummated rapidly and automatically, the chamber 1 may be filled and emptied many times within a short space of time. Thus by determining the size of the chamber 1 and adjusting the times of opening and closing of the various valves so that a known amount of liquid enters the chamber at each refilling, it will be seen that accurate measurement may be made of the quantity of liquid which passes through the apparatus. This feature of the invention will be found to be extremely advantageous in the accurate dispensing of certain kinds of liquid, such as gasoline, in relatively small quantities. Inasmuch as the wall 2 of the chamber 1 is preferably made of a transparent material, a purchaser of liquid being dispensed can readily see when he is receiving a proper quantity of liquid.

Various minor changes may be made in the form and proportion and the general combination of the several parts of the invention without departing from or sacrificing any of the principles thereof as outlined in the following claims.

What is claimed is:

1. In a device of the character described, a fluid chamber, a compressed air inlet valve therefor, a fluid motor for actuating the inlet valve, a fluid passageway connecting said motor with the lower part of the fluid chamber below the low liquid level therein whereby a liquid seal is formed at the lower end, a check valve in said passageway opening to permit flow of liquid to the motor when the compressed air valve is open, said motor having means for closing said air valve after it has been actuated a predetermined distance by said flow of liquid and a bleed hole through said valve to permit a restricted return flow of liquid after the air valve has been closed.

2. In a device of the character described, a fluid chamber, a compressed air inlet valve therefor, a cylinder, a piston in said cylinder and connected with the inlet valve, a fluid passageway connecting said cylinder with the lower part of the fluid chamber below the low liquid level therein whereby a liquid seal is formed at the lower end, a check valve in said passageway opening to permit flow of liquid to the cylinder when the compressed air valve is open, said piston having means thereon for closing the air valve after the piston has been actuated a predetermined distance by said flow of liquid, a bleed hole through said valve to permit a restricted return flow of liquid after the air valve has been closed, means for returning said piston to its original position, and means actuated by the piston when it has partially returned to its original position for opening said check valve.

In testimony that I claim the foregoing I have hereunto set my hand at Milwaukee, in the county of Milwaukee and State of Wisconsin.

OTTO R. PFAU.